UNITED STATES PATENT OFFICE.

WILLIAM C. SQUIER, OF KINMUNDY, ILLINOIS.

EYE-WASH.

SPECIFICATION forming part of Letters Patent No. 264,783, dated September 19, 1882.

Application filed January 20, 1882. (Specimens.)

*To all whom it may concern:*

Be it known that I, WILLIAM C. SQUIER, of Kinmundy, in the county of Marion and State of Illinois, have invented a new and Improved Eye-Wash; and I do hereby declare that the following is a full, clear, and exact description of the same.

My invention relates to an improved eye-wash or eye-balm, designed for inflamed or granulated eye-lids and chronic sore eyes.

In compounding the wash I take sulphate of zinc, one ounce; oil of winter-green, one-half ounce; laudanum, one half ounce; oil of sassafras, thirty drops; loaf-sugar, three tablespoonfuls. To the foregoing is added four quarts of soft water, the mixture thoroughly stirred, and then placed away in a glass jar for two or three weeks, until the ingredients have become thoroughly dissolved and mixed. The wash is then ready for use, and may be applied either by dropping a few drops into the eye or by means of a fine camel's-hair brush.

The above compound is not only useful for promoting a cure of inflamed eyes or granulated eye-lids, but is very beneficial in the case of the failing of the eyes from old age or ill health, when it strengthens and prolongs the sight.

Having thus described my invention, what I claim as new is—

The eye-wash herein described, consisting of the sulphate of zinc, oil of winter-green, laudanum, oil of sassafras, sugar, and soft water, prepared in or about the proportion described.

WILLIAM C. SQUIER.

Witnesses:
 FRANK KERN,
 J. C. GLENN.